United States Patent
Mishra et al.

(10) Patent No.: US 10,397,998 B2
(45) Date of Patent: Aug. 27, 2019

(54) DRIVER CIRCUIT AND METHOD

(71) Applicant: SIGNIFY HOLDING B.V., Eindhoven (NL)

(72) Inventors: Priya Ranjan Mishra, Banglore (IN); Rakeshbabu Panguloori, Banglore (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/525,547

(22) PCT Filed: Nov. 9, 2015

(86) PCT No.: PCT/EP2015/076071
§ 371 (c)(1),
(2) Date: May 9, 2017

(87) PCT Pub. No.: WO2016/075079
PCT Pub. Date: May 19, 2016

(65) Prior Publication Data
US 2017/0325306 A1    Nov. 9, 2017

(30) Foreign Application Priority Data

Nov. 12, 2014  (IN) .............................. 5684/CHE2014
Mar. 27, 2015  (EP) ..................................... 15161251

(51) Int. Cl.
*H05B 33/08*    (2006.01)

(52) U.S. Cl.
CPC ....... *H05B 33/0851* (2013.01); *H05B 33/089* (2013.01); *H05B 33/0812* (2013.01); *H05B 33/0815* (2013.01); *Y02B 20/347* (2013.01)

(58) Field of Classification Search
CPC ............ H05B 33/0815; H05B 33/0809; H05B 33/0821; H05B 33/0803; H05B 33/083;
(Continued)

(56) References Cited

U.S. PATENT DOCUMENTS 5,661,645 A  *  8/1997  Hochstein ............... H02J 9/065
                                                         363/89
7,952,294 B2     5/2011  Shteynberg et al.
(Continued)

FOREIGN PATENT DOCUMENTS

| CN | 1568639 A | 1/2005 |
|---|---|---|
| CN | 103262650 A | 8/2013 |

(Continued)

*Primary Examiner* — Wei (Victor) Chan

(57) ABSTRACT

A driver circuit has a driver unit (50) which provides a current for the load (51) based on an input voltage (10) comprising first and second terminals (10a, 10b). The driver unit (50) comprises a linear driver which comprises a current regulating element (Q3) between the input and the load, said element having a controllable resistive characteristic. A compensation unit (52) in series with the driver unit (50) and the input voltage provides a compensating voltage. This is used to control the voltage across the driver unit in dependence on the input voltage and operating conditions of the load. The compensation unit (52) comprises a switch mode power converter and a second capacitor (C2) as an energy source of the switch mode power converter, with the current regulating element (Q3), the load (51) and the second capacitor (C2) in series connection between the first and second terminals (10a, 10b). In this way, the operating range of the driver unit can be reduced to reduce power loss on the driver unit, and the compensating voltage can also be used with an energy harvesting system to increase overall system efficiency.

11 Claims, 7 Drawing Sheets

(58) Field of Classification Search
CPC .......... H05B 33/0887; H05B 33/0818; H05B 33/0845; H05B 33/0827; H05B 33/089; H05B 33/0812
USPC .......... 315/291, 307, 294, 122, 224, 185 R, 315/200 R
See application file for complete search history.

(56) References Cited

U.S. PATENT DOCUMENTS

| | | | |
|---|---|---|---|
| 8,710,752 | B2 | 4/2014 | Jin et al. |
| 2011/0080110 | A1 | 4/2011 | Nuhfer et al. |
| 2011/0221412 | A1 | 9/2011 | Li et al. |
| 2012/0068626 | A1* | 3/2012 | Lekatsas ............ H05B 33/0815 315/307 |
| 2013/0088171 | A1 | 4/2013 | Fensore |
| 2013/0300983 | A1* | 11/2013 | Yang .................... H05B 33/086 349/69 |
| 2013/0307878 | A1* | 11/2013 | Gao .................... G09G 3/3406 345/690 |
| 2014/0253056 | A1* | 9/2014 | Hu ........................ H02M 3/158 323/205 |
| 2014/0265884 | A1 | 9/2014 | Chung et al. |
| 2014/0339999 | A1 | 11/2014 | Melanson et al. |
| 2015/0312983 | A1* | 10/2015 | Hu ........................ F21K 9/1355 315/186 |
| 2016/0029451 | A1* | 1/2016 | Schijffelen ......... H05B 33/0809 315/193 |
| 2017/0273151 | A9* | 9/2017 | Dai .................... H05B 33/0818 |

FOREIGN PATENT DOCUMENTS

| | | |
|---|---|---|
| CN | 103269548 A | 8/2013 |
| GB | 2509099 A | 6/2014 |
| WO | 2008110990 A1 | 9/2008 |
| WO | 2014080337 A2 | 5/2014 |

\* cited by examiner

DRIVER CIRCUIT AND METHOD

CROSS-REFERENCE TO PRIOR APPLICATIONS

This application is the U.S. National Phase application under 35 U.S.C. § 371 of International Application No. PCT/EP2015/076071, filed on Nov. 9, 2015 which claims the benefit of India Patent Application No. 5684/CHE/2014, filed on Nov. 12, 2014 and European Patent Application No. 15161251.2, filed on Mar. 27, 2015. These applications are hereby incorporated by reference herein.

FIELD OF THE INVENTION

The invention relates to a driver circuit for delivering a current to a load. In preferred examples, it relates to a driver which receives a DC voltage input and generates a DC output voltage for application to a load.

BACKGROUND OF THE INVENTION

Energy saving is one of the most important requirements in any system or device. For this purpose, the AC grid is being replaced by local DC grids in some applications.

One advantage of DC grids is that they offer the opportunity to deploy compact low cost highly reliable linear drivers for LED based lighting.

In practice, to reduce energy consumption, dimming control technologies have also been employed in LED drivers. A wide dimming range is needed for accommodating different operating conditions. Traditionally, there are different categories of dimming methods, including analog dimming and pulse width modulation (PWM) dimming.

In analog dimming, current amplitude adjustment inherently gives rise to color temperature variations. The use of analog dimming is not recommended in applications where the color of the LED is critical.

In PWM dimming, the average amount of the LED current used for driving the LED light is usually determined based on the pulse width and period of a PWM signal. When the dimming level is decreased and the on-cycle of the LED current is shortened, human eyes can perceive a flicker of light. This restricts the dimming range (in particular the threshold for the minimum pulse width) to achieve predictable and acceptable performance from the LED device. In addition, the efficiency of LED drivers is in the range of 85-90% at low dimming levels.

Various control methods for LED dimming are known to control the color shift and flicker. In general lighting applications (indoor and outdoor lighting), the issue of efficiency and flicker is more important than the issue of color shift. Thus, analog dimming can be considered in indoor and outdoor lighting applications. Furthermore in an application using a DC grid, which is a local grid, the bus voltage variation (±2%) is usually less than for a mains AC application (±15%) hence simple low cost highly reliable linear drivers for LED based lighting can be used, as shown in FIG. 1.

The driver circuit shown in FIG. 1 comprises a DC input 10 such as a bus voltage, a load in the form of a string 12 of LEDs and a linear LED driver 14.

The linear LED driver 14 provides a resistance which varies in accordance with the load, resulting in a constant output voltage. It functions as a regulating device which is made to act like a variable resistor, continuously adjusting a voltage divider network to maintain a constant output voltage, and continually dissipating the difference between the input and regulated voltages as waste heat. Because the regulated voltage of a linear regulator must always be lower than input voltage, efficiency is limited and the input voltage must be high enough to always allow the active device to drop some voltage.

Linear drivers may be placed between the source and the regulated load (a series regulator), or may be placed in parallel with the load (shunt regulator). Simple linear regulators may for example only contain a Zener diode and a series resistor, whereas more complicated regulators include separate stages of voltage reference, error amplifier and power pass element. An emitter follower stage can be used to form a simple series voltage regulator.

The measured efficiency profiles of one example of linear LED driver at various DC bus voltages are shown in FIG. 2. The driven LED arrangement for example comprises a configuration of two parallel strings of two series LEDs giving a 20 W LED load.

The D axis stands for dimming level and the E axis stands for efficiency. FIG. 2 shows three different input bus voltages, 200V in plot 20, 210V in plot 22 and 220V in plot 24, and it shows the efficiency as a function of the dimming level. From FIG. 2, it is clear that the efficiency of a linear LED driver is very sensitive to the input-to-output voltage difference.

FIG. 3 shows the nature of the required input DC voltage $V_{DC}$ for efficient operation of the linear LED driver, as a function of the dimming level D. With an increase in dimming level (i.e. a reduction in the % drive level along the x-axis), the required input bus voltage across the LED and the linear driver is reduced; this is due to natural dependence of the LED string voltage on the LED current level. In particular, the LED string voltage decreases with a decrease in LED current. With a fixed DC grid voltage, the efficiency of the linear LED driver falls dramatically compared to a more efficient switch mode LED driver.

The lower efficiency of the linear driver can be addressed by providing an adaptive DC grid voltage as disclosed in WO2014/080337. A problem with this solution is that the efficiency figures deteriorate for the complete lighting system as many of them will not operate at their maximum efficiency due to variation in LED characteristics due to variation in manufacturing process from one batch to another. To avoid this problem, binning can be employed. However, this will also not be sufficient to take care of temperature and aging variations among large numbers of luminaires.

An illustration of such variations from luminaire to luminaire is shown in FIG. 4, which shows different curves of voltage versus dimming level for three different luminaires, L1, L2 and L3. In a large installation, where sets of luminaires may be connected in daisy chain mode, each luminaire experiences different voltage inputs due to cable resistance, and the DC bus experiences 100 Hz ripple from the output of a DC controller switch box. These practical issues do not yield very high efficiency for linear LED drivers at all possible dimming levels. Therefore, there is a need for a solution which enables linear LED drivers to operate at very high efficiency (such as greater than 96%) over the full dimming range i.e. from 100% to 10%, and without requiring characterization of the LEDs using binning.

Known active driver solutions need components of rated capacity and thus higher foot print and higher cost.

U.S. Pat. No. 8,710,752 discloses a system which drives multiple strings of LEDs, in which an optimal current level for each string is determined. It aims to reduce the size of the LED driver. The circuit combines a boost converter and a linear converter.

SUMMARY OF THE INVENTION

Based on the characteristic shown in FIG. 2, at a given dimming level, the efficiency of the driver at a different voltage across the driver and LED is different. This is because the LED string forward voltage keeps constant at that given dimming level, and the difference between the input voltage and the LED string forward voltage is applied across the linear driver, which produces a power loss. The more the difference, the lower the efficiency. Thus it would be advantageous to achieve an optimum efficiency of the linear driver at a given dimming level, regardless of how the input voltage varies. Additionally, as shown in FIG. 2 and FIG. 3, different dimming levels requires a different voltage across the driver and LED to achieve optimum efficiency, thus it would also be advantageous to achieve an optimum efficiency of the linear driver regardless of how the dimming level varies.

US20120068626A1 discloses a cascade connection of a voltage supply, a switching regulator, and a linear current regulator with LED load. Wherein the switching regulator is a buck converter and provides a drive voltage Vdrive to the current regulator that avoids significant dissipation of excess power in the current regulator.

In this prior art, a buck converter is used for providing a voltage drop on the linear switch to reduce its power loss.

A purpose of the present application is providing an alternative solution to optimize the voltage drop on the linear switch so as to reduce power loss. To at least address the above concern, the invention is defined by the claims.

A very basic idea of embodiments of the invention is to provide a capacitor in series connection with the linear switch and the load, between the input terminals, and regulating the voltage on the capacitor according to the input voltage and the voltage across the LEDs so as to regulate the voltage across the linear switch, to make the voltage across the linear switch at a more efficient operating point of the linear switch. The voltage across the LEDs usually relates to its operating conditions such as dimming level, ageing and temperature.

According to an aspect of the invention, there is provided a driver circuit for delivering a current to a load, comprising:

an input for receiving an input voltage, comprising first and second terminals (10a,10b);

a driver unit for providing a current for the load from the input voltage, wherein the driver unit (50) comprises a linear driver which comprises a current regulating element (Q3) between the input and the load, said element having a controllable resistive characteristic;

a compensation unit in series with the driver unit and the input, for providing a compensating voltage thereby to control the voltage across the driver unit in dependence on the input voltage and operating conditions of the load;

wherein the compensation unit (52) comprises a switch mode power converter and a second capacitor (C2) as an energy source of the switch mode power converter, with the current regulating element (Q3), the load (51) and the second capacitor (C2) in series connection between the first and second terminals (10a,10b).

This arrangement combines a driver unit with a compensating unit which provides a compensating voltage. The compensating voltage results in a particular voltage across the driver at depending on the particular operating conditions and the input voltage, so that it is no longer determined only by the driver unit. In this way, the driver circuit can be made to operate more efficiently. For example, different input voltage and different operating conditions of the load may influence the driver circuit to manipulate the voltage across the driver unit in order to function efficiently.

The input voltage is preferably a DC voltage and the driver circuit is for delivering a DC output voltage. However, the inventive concept can also be applied to an AC system.

By providing a required voltage step using the compensating voltage, energy can also be harvested from the required voltage step. This embodiment can further improve efficiency if the harvested energy is used by other components or if is can be fed back to the input again.

In one example, the different operating conditions may relate to different output levels of the load, for example the dimming level of a lighting system. Alternatively, the different operating conditions may for example be associated with different temperatures or with different degrees of ageing, but for the same desired output level.

The driver unit may have a small voltage drop to reduce power loss in the driver unit. The maximum voltage drop may be selected to give a desired efficiency and headroom for a variation, for example 1 to 2%, in the supply/input voltage. This maximum may be as low as 4V for a high voltage supply of around 220V, and it may be even lower, for example down to 1V. The compensation unit provides the main part of the difference between the input supply voltage and the desired optimum operating voltage for the load.

The compensation unit may comprise a switch mode power converter, and in this case, the compensation voltage may be provided by varying a duty cycle of operation of the compensation unit.

The effect of the compensation unit is that the driver unit does not need to be a full rated driver because load variations are accommodated by the compensation unit, enabling a more regulated supply to be delivered by the driver unit.

The driver unit preferably comprises a linear driver, and said linear driver comprises a current regulating element between the input and the load, said element having a controllable resistive characteristic. Traditionally, the voltage difference between the input voltage and the load voltage is fully applied across the linear driver. Since the linear driver has an inherent inefficiency, a drawback of being sensitive to the voltage difference across the driver is that the power loss is great if the voltage difference is large. However, in this embodiment the voltage difference across the linear driver is reduced by the introduction of the compensation unit. This reduces power wastage and thus increases efficiency.

The compensation unit may comprise a switch mode power converter, for example a DC-DC boost converter. The power converter can in one example generate an output which can be used to harvest energy. The switch mode power converter has an inherent advantages of high efficiency, thus although a substantial part of the traditional voltage difference between input voltage and load voltage is moved from the linear driver unit to the compensation unit, this substantial part of power/voltage will not lead to a large power loss. In other words, the power traditionally applied to the linear driver, a high power loss unit, is relocated to the switch mode power converter, a low power loss unit. Thus the overall efficiency is improved.

The input preferably comprises first and second terminals, and the circuit comprises a first capacitor between the first and second terminals. The compensation unit preferably comprises a second capacitor as an energy source of the power converter, with the driver unit, the load and the second capacitor in series between the first and second terminals. The second capacitor is charged and discharged to keep a level corresponding to the desired compensation voltage. For the case of a load in the form of an LED arrangement, the current through the LED arrangement is generally fixed for a particular dimming level. The power converter has a duty cycle which is varied to vary the voltage across the second capacitor.

The second capacitor thus has a voltage drop across it, which then dictates the remaining voltage across the driver unit.

The switch mode power converter of the compensation unit may comprise an inductive DC-DC boost converter, which comprises a power switch and an inductor, said power switch is adapted to turn on and off alternatively to discharge energy from the second capacitor so as to set the voltage across the second capacitor as said compensation voltage. This embodiment provides a specific implementation of the switch mode power converter of the compensation unit. Since the compensation voltage is relatively small with respect to the input voltage, such a boost converter can boost the compensation voltage to a higher voltage for other use within the system. Note that a buck converter may also be used if a low voltage component is to be powered by the harvested energy of the compensation unit.

The inductive DC-DC boost converter preferably has an output which is adapted to connect either to an external voltage supply or to the input, through an output diode. This provides harvesting of the energy dissipated as a result of the voltage drop which is required in order for the driver unit to operate at a desired voltage point.

The operating conditions of the load may comprise any one or more of the following:
operating current;
aging of the load; or
operating temperature of the load.

Each of these operation conditions may result to a certain load voltage. The compensation unit is then adapted to provide the compensation voltage which sets the voltage across the driver to achieve a desired efficiency under the certain load voltage and the input voltage.

The load may comprise an LED arrangement, and the circuit further comprises:
a first unit for obtaining a desired operating voltage of the LED arrangement given the operating conditions;
a second unit for obtaining the input voltage;
a controller adapted for:
setting the compensation unit to provide the compensation voltage with an amplitude of a substantial portion of the difference between the input voltage and the desired operating voltage of the LED arrangement.

In this way, a controller is used to derive the compensation voltage in dependence on the operating conditions and the input voltage. The controller controls the voltage across the compensation unit and in turn the voltage across the driver unit accordingly.

The circuit is for example adapted to receive a dimming level of the LED arrangement, and the first unit is then adapted to:
correlate said dimming level with an operating current level for providing said dimming level; and
obtain said desired operating voltage of the LED arrangement according to the operating current level, wherein said driver unit is adapted to deliver said operating current level to the LED arrangement, and the controller is adapted to set the compensation unit to provide the compensating voltage that minimizes the voltage across the driver unit.

In this way, the driver unit is operated at a most efficient operating voltage for the particular dimming level and the required voltage drop across the driver unit is managed efficiently. The particular dimming level is then the main operating characteristic which is taken into account, but other characteristics may additionally be taken into account such as temperature and ageing.

The controller may be further adapted to configure the voltage drop across the driver unit to have a maximum value, for the range of allowed operating conditions, which is at most k times the maximum compensating voltage for the range of allowed operating conditions, wherein k=0.5, more preferably k=0.3, even more preferably k=0.2; and/or wherein the maximum compensating voltage is less than 0.2 times the maximum DC input voltage.

In this way, most of the desired reduction between the supply input voltage and the load voltage is handled by the compensation unit. The compensation unit can however be a small low cost unit.

Another aspect of the invention provides a lighting circuit, comprising:
a driver circuit of the embodiments of the invention; and
the load driven by the driver circuit, which comprises an LED arrangement.

Another aspect of the invention provides a driving method for delivering a current to a load, comprising:
receiving an input voltage;
providing a current for the load from the input voltage via a driver unit;
providing a compensating voltage between the input voltage and the driver unit thereby to adjust the voltage across the driver unit in dependence on the input voltage and operating conditions of the load.

The compensation voltage sets the voltage across the driver unit to achieve a desired efficiency under the operating conditions.

The compensation voltage is with an amplitude of a substantial portion of the difference between the input voltage and the desired operating voltage of the load at the given operating conditions. Thus, the difference in voltage from the input voltage is handled primarily by the compensation voltage.

Providing a current for example comprises providing a current to the load using a linear current regulator, and providing the compensation voltage comprises operating a switch mode power converter, such as a DC-DC boost converter. In this way, a linear regulator (such as a constant current linear regulator) is combined with a power converter.

The output from the switch mode power converter may be provided through an output diode either to the input or to an external voltage supply. This provides energy harvesting.

When the load comprises an LED arrangement, the method may comprise:
receiving a dimming level of the LED arrangement;
correlating said dimming level with an operating current level for providing said dimming level;
obtaining a desired operating voltage according to the operating current level;
delivering said operating current level to the LED arrangement; and providing a compensating voltage to control the voltage across the driver unit and make the driver unit achieve a desired efficiency at that current level.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

Embodiments of the invention provide a driver circuit in which a driver unit provides a current for the load from an input voltage, and a compensation unit in series with the driver unit provides a compensating voltage. This compensating voltage is used to adjust the voltage across the driver unit in dependence on the input voltage and operating conditions of the load. In this way, the operating range of the driver unit can be reduced, and power loss in the driver unit is decreased. However, the desired operating voltage remains across the load. Preferably the compensating voltage can also be used with an energy harvesting system to increase overall system efficiency.

Embodiments of the invention will be described based on one preferred application for driving an LED arrangement.

Figure 5:
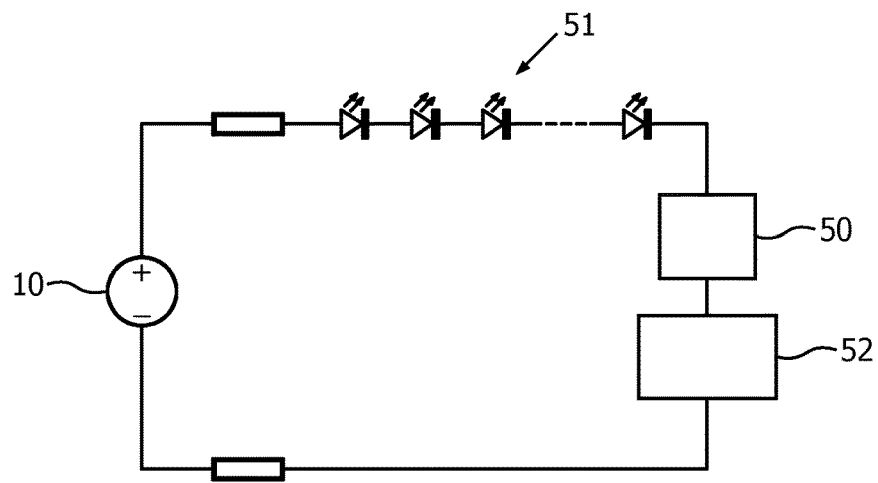
FIG. 5 shows a first example of driver circuit in schematic form.

FIG. 5 shows the circuit using functional blocks, which comprises a main linear LED driver 50 for providing a constant and desired LED current. Typically 95 to 98% of the circuit power dissipation takes place in the combination of the driver 50 and the LED arrangement 51. The linear driver may provide a modulated or unmodulated current output. The overall circuit aims to facilitate a wide dimming range.

Cascaded in series with the main linear driver is a compensation unit in the form of a compact mini boost converter 52. The mini boost converter 52 has a much smaller size than would be required as the sole driver, for example around one tenth of the capacity of a regular boost driver generally employed, and this explains the meaning of the term "mini". The mini boost converter 52 handles around 2 to 5% of the power dissipation. The power dissipation of driver 50/LED 51 and the power dissipation of compensation unit 52 together constitute the total 100% power.

The power generated by the mini boost converter 52 can optionally be used to feed power back to the DC grid or to a dedicated supply for example for powering sensors or a controller.

The linear LED driver may operate at 95-98% efficiency as discussed below and the mini boost converter can operate at greater than 85% efficiency. Using the linear driver to handle at least 95% of the power means that the overall efficiency is greater than 94% (0.95*0.95+0.85*0.05).

Figure 6:
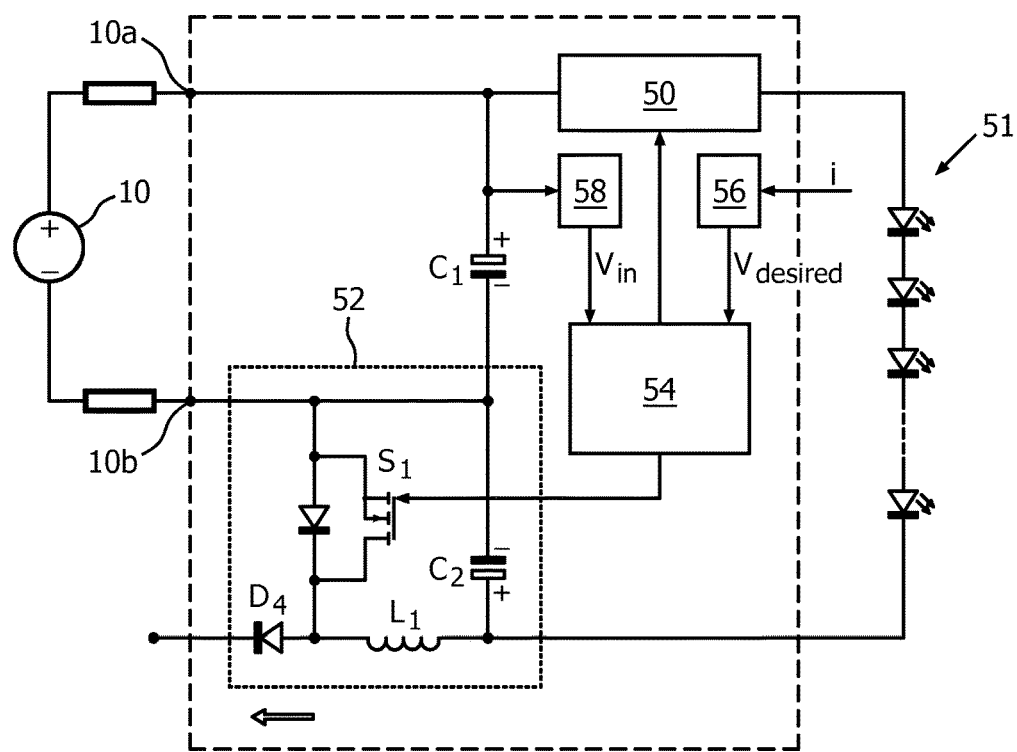
FIG. 6 shows a circuit implementation for the circuit of FIG. 5.

FIG. 6 shows a more detailed circuit implementation in which the LED string voltage is less than the DC bus voltage.

The input supply comprises first and second terminals $10a,10b$, and the circuit comprises a first capacitor C1 between the first and second terminals. The function of this first capacitor is smoothing HF component of the input voltage.

The compensation unit 52 comprises a switch mode power converter with a second capacitor C2 as an energy source of the power converter. The driver unit 50, the load 51 and the second capacitor C2 in series between the first and second terminals $10a,10b$.

In the example shown, the switch mode power converter comprises an inductive DC-DC boost converter which comprises a power switch S1 and an inductor L1. The second capacitor C2 and the inductor L1 are in series with the power switch S1 in parallel with the series combination of the inductor L1 and capacitor C2. The power switch S1 is adapted to turn on and off alternately to discharge energy from the second capacitor C2 so as to set the voltage across the second capacitor C2 to define the compensation voltage.

The second capacitor C2 effectively holds the input voltage of the switch mode power converter, and it is charged by the regulated current output from the linear driver 50. The boost converter in one example boosts the voltage across the second capacitor C2 to the DC bus voltage, so that energy can be recycled to the circuit supply. The output of the compensation unit can instead be connected either to an external voltage supply (VAUX). An output diode D4 is shown for supplying current for energy harvesting. Energy accumulated on the capacitor C2 can be fed back to the DC grid or to another input supply or local supervisory circuits including sensors.

The circuit provides that the difference between the input voltage across the terminals $10a,10b$ and the voltage across the LED string 51 is shared between the linear driver 50 and the compensation unit 52.

This circuit configuration thus places the linear driver and the LED string is in series as one branch, with the two capacitors C1 and C2 in series as a second parallel branch. In the circuit of FIG. 6, 2-4% of voltage regulation is controlled by the linear driver 50 and voltage regulation beyond this is implemented by the mini-boost converter 52.

The linear driver 50 and the compensation unit are controlled by a controller 54 to provide the desired current and voltage across the load, as well as the desired sharing of voltage drops across the compensation unit and across the linear driver.

The controller 54 receives an indication of the desired operating voltage of the LED arrangement. This is provided by a first input unit 56. This unit processes information "i" which can include:

temperature;
    information indicating a degree of ageing;
    a required dimming level;

Practically, the operating condition may inherently lead to a certain operating voltage of the LED arrangement, which is the forward voltage of the LED string, so that no active sensing is required and the information can relate to the drive conditions. However, sensing can also be used. For example, as the LED ages, a certain operating current flowing through the LED arrangement will generate a corresponding operating voltage. Thus the first unit 56 can detect the voltage difference across the LED arrangement so as to receive the indication of the desired operating voltage of the LED arrangement. Alternatively, there may also be pre-stored data set in the controller 54 which indicates a mapping between the operating voltage and the operating conditions such as current, aging and temperature. The temperature can be detected via a temperature sensor near the LED, the aging time can be retrieved by the controller based on a running hour record, and the current can be obtained via the input dimming level.

A second unit 58 obtains the input voltage and provides this to the controller 54. The controller selects the compensation voltage, which has an amplitude of a substantial portion of the difference between the input voltage $V_{in}$ and the desired operating voltage $V_{desired}$ of the LED arrangement. Thus, most of the required voltage drop is handled by the compensation unit. As discussed above, to order to provide a voltage across the driver unit at 2% of the input voltage, the amplitude of the compensation voltage is the difference between input voltage and LED operating voltage, minus 2% of the input voltage.

The controller also sets the current level, by controlling the linear driver 50. The current level is selected based on a desired dimming level, which may form part of the information provided to the first unit 56.

Figure 1:
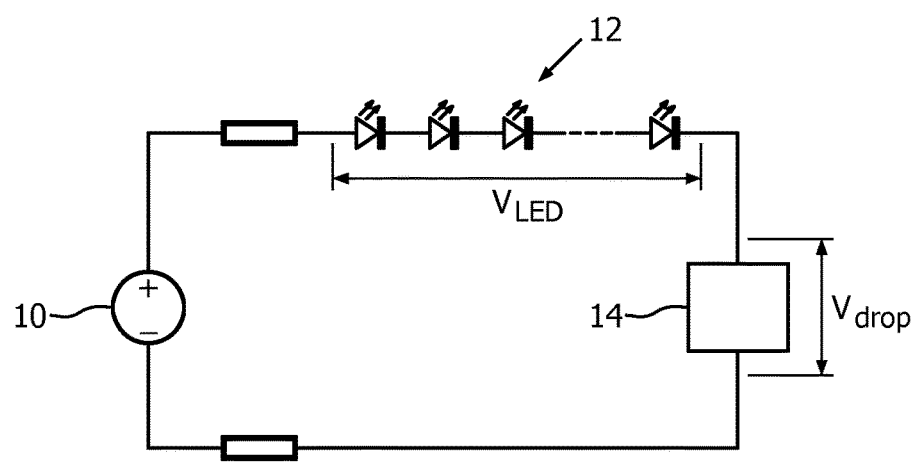
FIG. 1 shows a known LED driver circuit.
Figure 2:
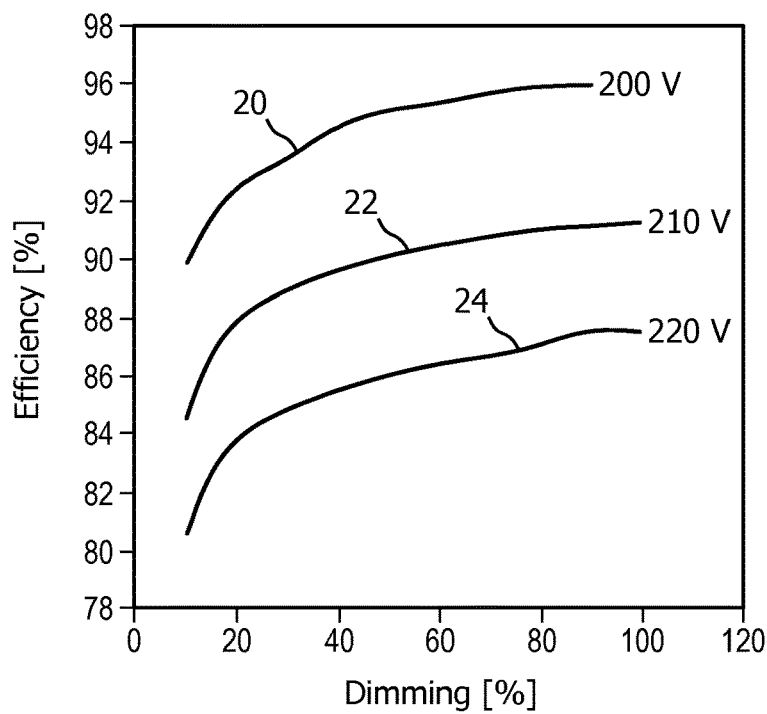
FIG. 2 shows the efficiency profiles of one example of linear LED driver at various DC bus voltages.
Figure 3:
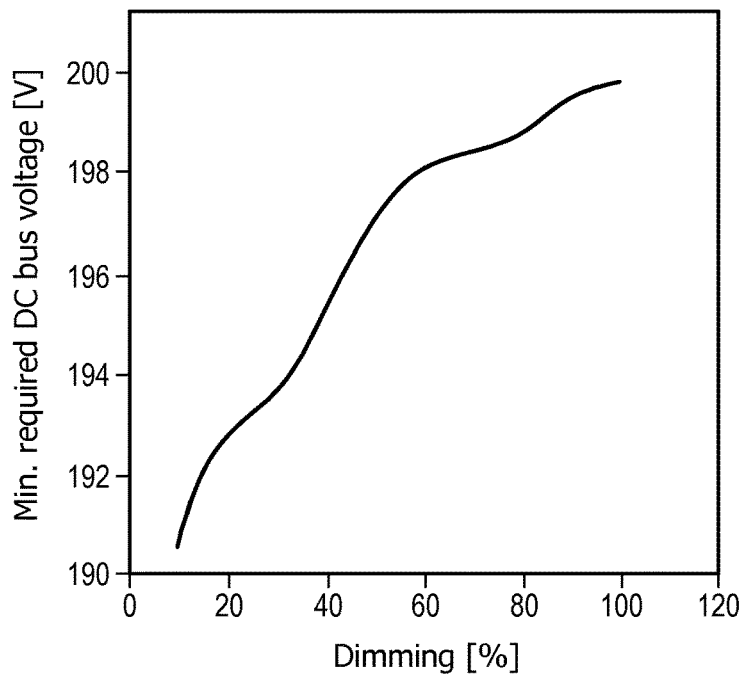
FIG. 3 shows the nature of the required input DC voltage for efficient operation of the linear LED driver, as a function of the dimming level.
Figure 4:
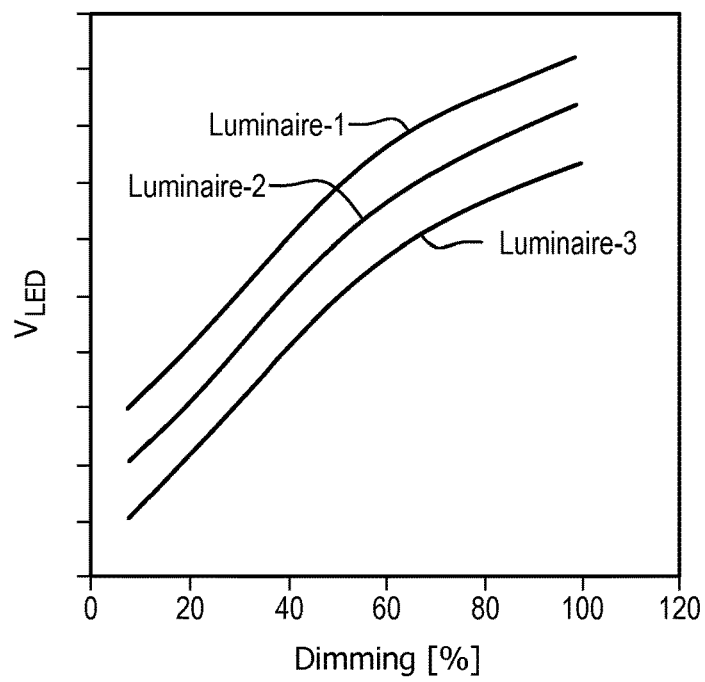
FIG. 4 shows variations from luminaire to luminaire in the curves of voltage versus dimming level.

Alternatively, the dimming level can be correlated with an operating current level to providing said dimming level. A desired operating voltage of the LED and the linear driver, to achieve a desired efficiency of the linear driver, can then be sent according to the operating current level, using the relationships explained with reference to FIGS. 2 and 3. Then the linear driver 50 is controlled by the controller 54 to deliver the operating current level to the LED arrangement, and the controller 54 is also adapted to set the compensation unit to provide the compensating voltage which is the difference between the input voltage and the desired operating voltage of the LED and the linear driver as shown in FIGS. 2 and 3, to make the driver unit achieve the desired efficiency at that current level and for that input voltage.

Note that the first and second units 56 and 58 are only shown as separate units for ease of explanation. In practice, they may form part of the controller 54, which receives the required inputs and delivers suitable signals for controlling the linear driver and the compensation unit.

Figure 7:
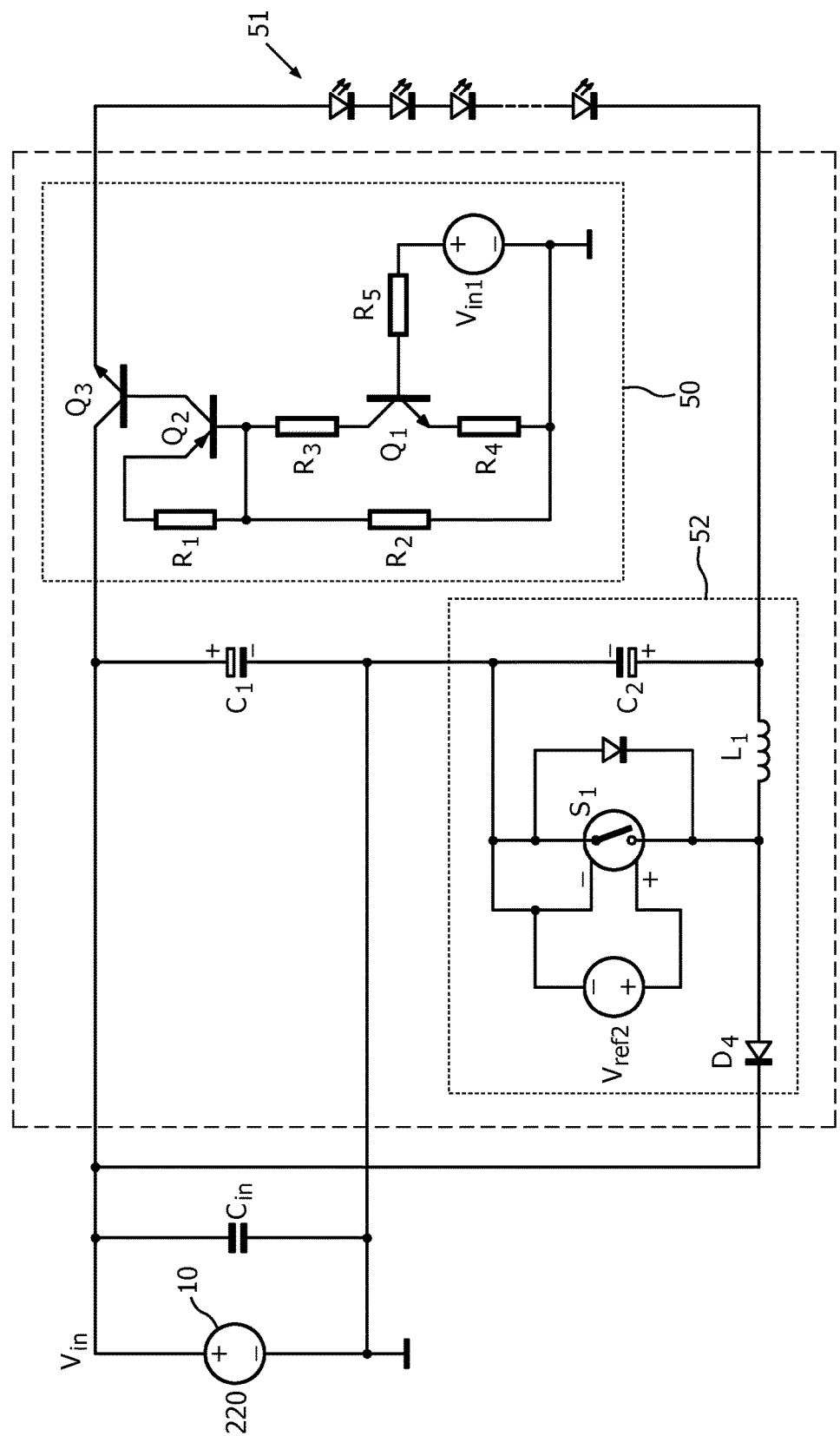
FIG. 7 shows a circuit simulation for the circuit of FIG. 6.

FIG. 7 shows a more specific circuit topology for the circuit of FIG. 6, with the output of the mini boost converter connected to the input supply Vin.

It also shows an example of linear driver 50.

The linear driver comprises a current regulating element in the form of an emitter follower power transistor Q3 between the input and the load. The transistor has a controllable resistive characteristic. The resistance is controlled by an input voltage Vin1 which is supplied to the base of a transistor Q1 through a base resistor R5.

The voltage Vin1 controls the linear driver. The voltage Vin1 controls the base current of a transistor Q2, which in turn controls the collector current of transistor Q2 which is the base current of the power transistor Q3. The base current of power transistor Q3 changes the current flowing through the linear driver to the load.

The LED arrangement for example comprises an LED string is of rating 200V, 100 mA. The overall circuit is thus a 20 W LED driver, and is based on a on 220V DC grid.

Figure 8:
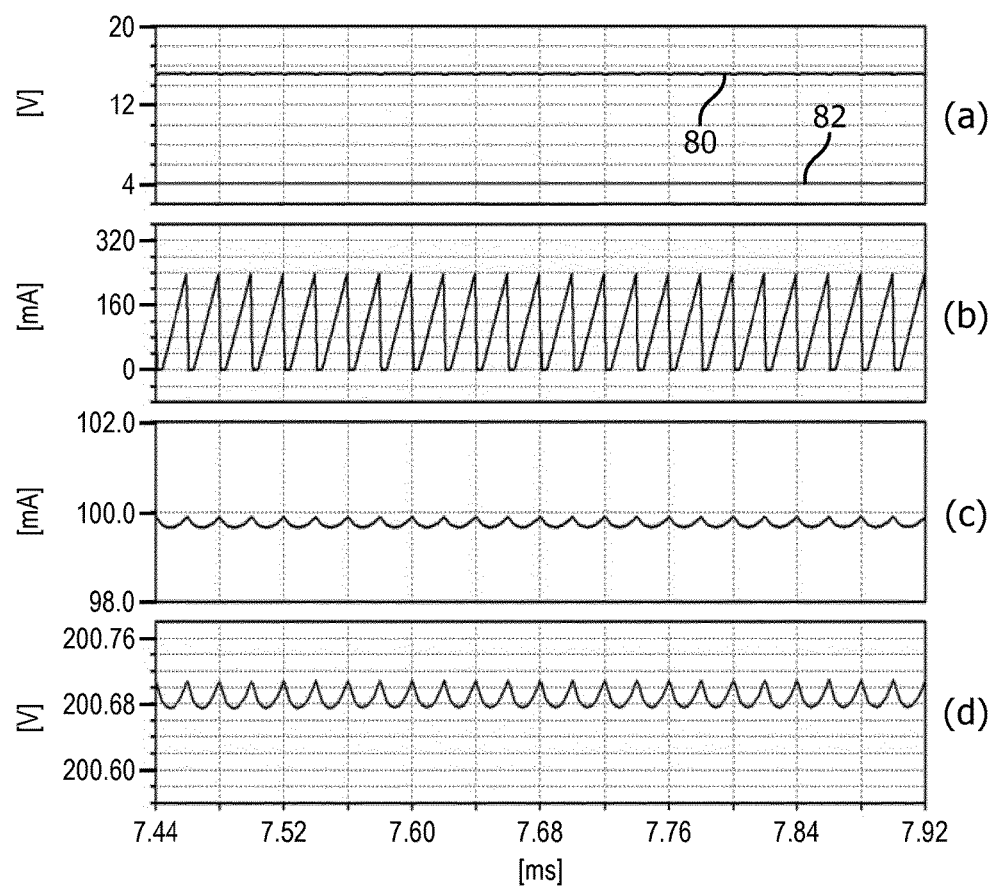
FIG. 8 shows simulation results during a full brightness mode with fixed input voltage.
Figure 9:
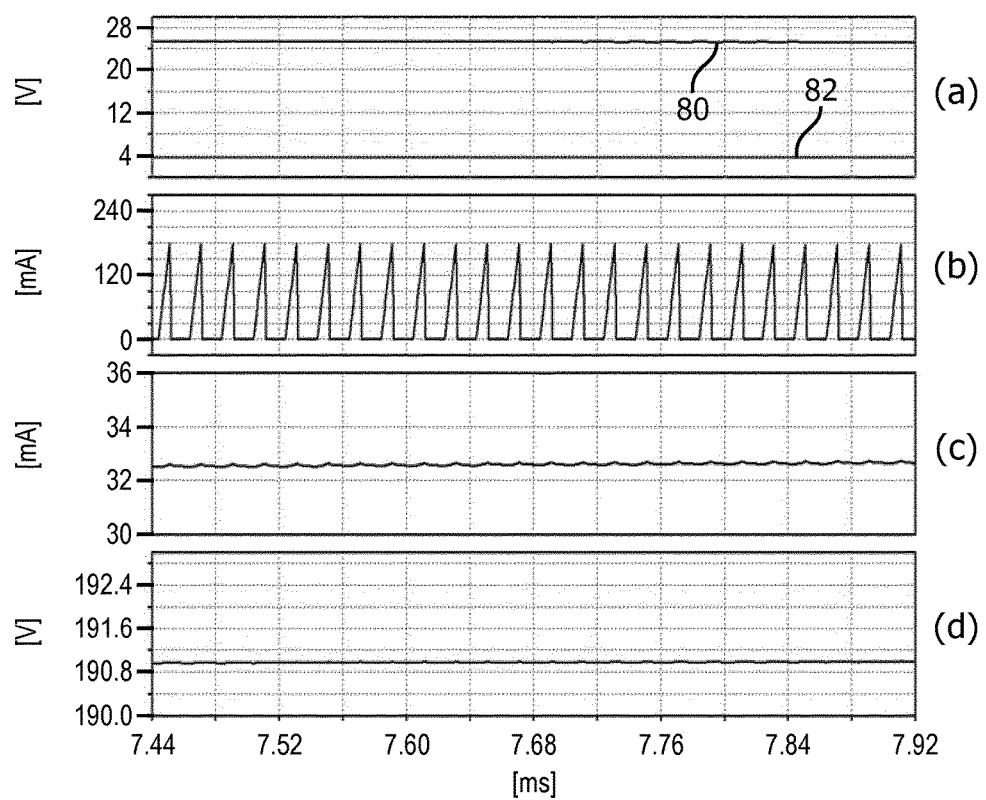
FIG. 9 shows simulation results during a ⅓rd brightness mode with fixed input voltage.

FIG. 8 shows simulation results for the fixed DC input voltage of 220V during a full brightness mode (100 mA). FIG. 9 shows simulation results for the fixed DC input voltage of 220V during a ⅓rd brightness mode (33 mA).

In each case, plot (a) shows the output of the mini boost converter as line 80 and the voltage drop across the linear driver as line 82. Plot (b) shows the inductor current of the mini boost converter. Plot (c) shows the LED current and plot (d) shows the LED voltage.

From the results, it is seen that the voltage drop across the linear driver is approximately 4V (~2% of 220V DC). The LED string voltage at that current is 200V. The difference between the input DC grid voltage and LED string voltage, minus the above voltage drop, is absorbed by mini-boost converter 52 to achieve good efficiency. In this case, the output voltage of the mini-boost converter is 16V during the full brightness mode and is increased to 25V during the ⅓rd brightness mode to absorb the change in LED string voltage because of dimming since in ⅓ brightness the LED string voltage is lowered to 191V.

These results are based on a fixed DC supply voltage of 220V.

The efficiency performance can be calculated.

(i) Full Brightness Mode

LED power=200V*100 mA=20 W

Power loss across linear driver=4V*100 mA=0.4 W

Power handled by mini-boost converter=16V*100 mA=1.6 W

Assuming efficiency of 80% for mini-boost converter, power loss in this operation=1.6*0.2=0.32 W Input power=20 W+0.4 W+0.32 W=20.72 W Efficiency=output power/input power=20/20.72=96.5%

(ii) ⅓rd Brightness Mode

LED power=191V*33 mA=6.303 W

Power loss across linear driver=4V*33 mA=0.132 W

Power handled by mini-boost converter=25V*33 mA=0.825 W

Assuming efficiency of 70% for mini-boost converter at 30% dimming level, power loss in this operation=0.825*0.3=0.2475 W Input power=6.303 W+0.132 W+0.2475 W=6.682 W Efficiency=output power/input power=6.303/6.682=94.32%

With only a linear regulator, the efficiency at ⅓rd brightness would have been 6.303 W/(6.303 W+29V*33 mA)=86.81%. The FIG. 29V is the difference between 220V and 191V and is fully applied across the linear driver.

Figure 10:
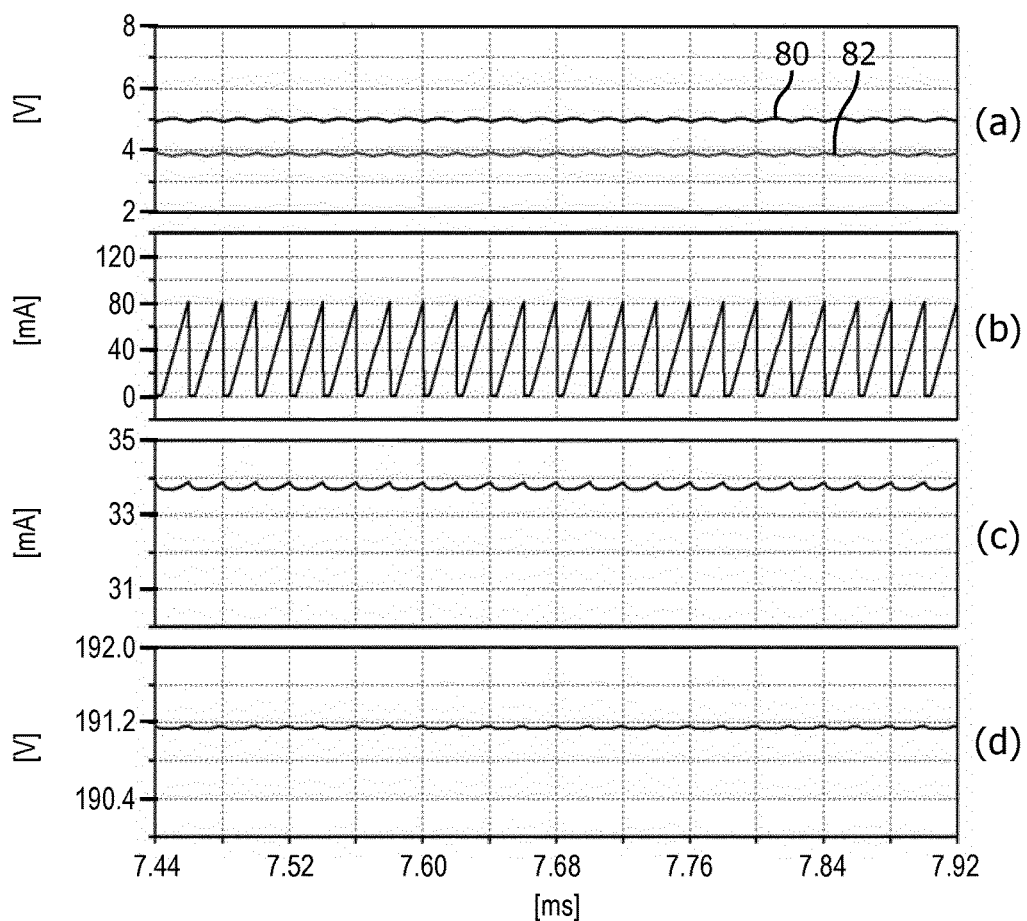
FIG. 10 shows simulation results during a ⅓rd brightness mode with adaptive input voltage.

As mentioned above, there are also systems which apply an adaptive DC grid voltage, in which the DC grid voltage adapts to absorb the change in LED string voltage (due to dimming). Corresponding simulation results are shown in FIG. 10 for the ⅓rd brightness mode. The smaller voltage drop required across the mini-boost converter can be seen.

LED power=191V*33 mA=6.303 W

Power loss across linear driver=4V*33 mA=0.132 W

Power handled by mini-boost converter=5V*33 mA=0.165 W (assuming the DC grid adapts to near 200V from 220V)

Assuming efficiency of 70% for mini-boost converter at 30% dimming level, power loss in this operation=0.165*0.3=0.0495 W Input power=6.303 W+0.132 W+0.05 W=6.485 W Efficiency=output power/input power=6.303/ 6.485=97.19%

From the simulations that have been carried out, it can be seen that the luminaire efficiency can be maintained above 94% with a normal DC grid and above 97% with an adaptive DC grid.

Figure 11:
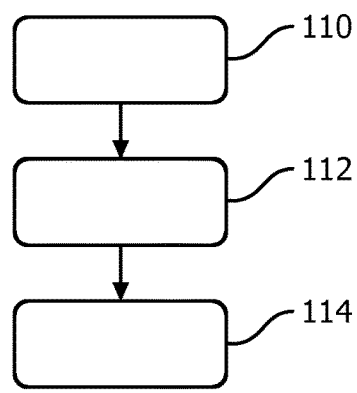
FIG. 11 shows an example of the method of the invention.

FIG. 11 shows a method in accordance with an example of the invention. The method comprises receiving an input voltage in step 110, providing a current for the load from the input voltage via a driver unit in step 112 and providing a compensating voltage in step 114 thereby to adjust the voltage across the driver unit in dependence on the input voltage and operating conditions of the load.

The invention has been described above in connection with the driving of LEDs. More generally, the invention is of particular interest for drivers which deliver a controlled current to a load.

Even more generally, the invention can be used for driving a load with a desired voltage, which enables a step down in voltage from an initial supply to be implemented in an efficient way, and which can enable energy harvesting.

Only one example of linear regulator has been shown. However, other types of linear regulator may be employed.

The system makes use of a controller. Components that may be employed for the controller include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A driver circuit for delivering a current to a load, comprising:

an input for receiving an input voltage, comprising first and second terminals;

a driver unit for providing a current for the load from the input voltage, wherein the driver unit comprises a linear driver which comprises a current regulating element (Q3) in series between the input and the load, said current regulating element having a controllable resistive characteristic, an operating current level for the load being controlled by a driver input voltage controlling a resistance of the current regulating element;

a compensation unit in series with the driver unit and the input, for providing a compensating voltage thereby to control the voltage across the driver unit in dependence on the input voltage and operating conditions of the load;

wherein the compensation unit comprises a switch mode power converter and a second capacitor (C2) as an energy source of the switch mode power converter, with the current regulating element (Q3), the load and the second capacitor (C2) in series connection between the first and second terminals, wherein the second capacitor (C2) is disposed at the output of the load and is adapted to be charged by a portion of the current from said input voltage that has flowed through the current regulating element (Q3) and the load;

wherein the driver input voltage controls a base current of a first transistor coupled to the current regulating element; and wherein the first transistor controls a collector current of a second transistor coupled to the current regulating element.

2. A driver circuit as claimed in claim 1, wherein the circuit comprises a first capacitor (C1) between the first and second terminals.

3. A driver circuit as claimed in claim 1, wherein the switch mode power converter comprises an inductive DC-DC boost converter, wherein the inductive boost converter comprises a power switch (S1) and an inductor (L1), wherein said power switch is adapted to turn on and off alternatively to discharge energy from the second capacitor (C2) so as to set the voltage across the second capacitor as said compensation voltage.

4. A driver circuit as claimed in claim 3, wherein the DC-DC boost converter has an output which is adapted to connect either to an external voltage supply or to the input, through an output diode (D4).

5. A driver circuit as claimed in claim 4, wherein the operating conditions of the load comprises any one or more of the following:

operating current;
aging of the load; and
operating temperature of the load,
and wherein said compensation unit is adapted to provide the compensation voltage which sets the voltage across the driver unit to achieve a desired efficiency under the operating conditions.

6. A driver circuit as claimed in claim 5, wherein the load comprises an LED arrangement, and the circuit further comprises:

a first unit for obtaining a desired operating voltage (Vdesired) of the LED arrangement given the operating conditions;
a second unit for obtaining the input voltage (Vin);
a controller adapted for:
setting the compensation unit to provide the compensation voltage with an amplitude of a substantial portion of the difference between the input voltage and the desired operating voltage of the LED arrangement.

7. A driver circuit as claimed in claim 6, wherein the circuit is adapted to receive a dimming level of the LED arrangement, and the first unit is adapted to:
   correlate said dimming level with an operating current level for providing said dimming level; and
   obtain said desired operating voltage ($V_{desired}$) according to the operating current level,
   wherein said driver unit is adapted to deliver said operating current level to the LED arrangement, and the controller is adapted to set the compensation unit to provide the compensating voltage that minimizes the voltage across the driver unit so as to make the driver unit achieve a desired efficiency at that operating current level, wherein the controller is adapted to control the switch mode power converter to discharge energy from the second capacitor (C2) so as to set the voltage across the second capacitor (C2) to define the compensation voltage.

8. A driver circuit as claimed in claim 6, wherein:
   the controller is further adapted to configure the voltage drop across the driver unit to have a maximum value, for the range of allowed operating conditions, which is at most k times the maximum compensating voltage for the range of allowed operating conditions, wherein k is one of k=0.5, k=0.3, or k=0.2; and/or wherein the maximum compensating voltage is less than 0.2 times the maximum DC input voltage.

9. A lighting circuit, comprising: a driver circuit as claimed in claim 1, and the load driven by the driver circuit, which comprises an LED arrangement.

10. A driver circuit as claimed in claim 1, wherein said second capacitor (C2) is adapted to absorb a voltage such that the voltage across the driver unit and the load is smaller than the input voltage.

11. A driver circuit as claimed in claim 1, wherein the collector current of the second transistor is the base current of the current regulating element.

\* \* \* \* \*